(12) United States Patent
Agiwal et al.

(10) Patent No.: US 11,711,132 B2
(45) Date of Patent: *Jul. 25, 2023

(54) METHOD AND APPARATUS FOR HANDLING SCHEDULING REQUEST (SR) CANCELLATION, RANDOM ACCESS (RA) PRIORITIZATION AND CONCURRENT OCCURRENCE OF BEAM FAILURE RECOVERY (BFR) ON PRIMARY CELL (PCELL) AND SECONDARY CELL (SCELL)

(71) Applicant: Samsung Electronics Co., Ltd., Suwon-si (KR)

(72) Inventors: Anil Agiwal, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,336

(22) Filed: Feb. 11, 2022

(65) Prior Publication Data
US 2022/0173787 A1 Jun. 2, 2022

Related U.S. Application Data

(63) Continuation of application No. 16/946,918, filed on Jul. 10, 2020, now Pat. No. 11,251,855.
(Continued)

(51) Int. Cl.
*H04B 7/06* (2006.01)
*H04W 74/08* (2009.01)
(Continued)

(52) U.S. Cl.
CPC .......... *H04B 7/0695* (2013.01); *H04W 16/28* (2013.01); *H04W 28/0278* (2013.01);
(Continued)

(58) Field of Classification Search
CPC .. H04B 7/0695; H04B 7/0602; H04B 7/2121; H04B 7/2123; H04W 74/0808;
(Continued)

(56) References Cited

U.S. PATENT DOCUMENTS

2019/0306875 A1* 10/2019 Zhou ................... H04B 7/0695
2019/0349061 A1* 11/2019 Cirik ..................... H04L 1/1861
(Continued)

FOREIGN PATENT DOCUMENTS

WO 2019135654 A1 7/2019

OTHER PUBLICATIONS

Ghosh, Arunabha, et al. "Broadband wireless access with WiMax/802.16: current performance benchmarks and future potential." IEEE communications magazine 43.2 (2005): 129-136. (Year: 2005).*
(Continued)

*Primary Examiner* — Sharad Rampuria (57) ABSTRACT

A communication method and system for converging a $5^{th}$ generation (5G) communication system for supporting higher data rates beyond a $4^{th}$ generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method performed by a terminal for handling scheduling request (SR) cancellation in a wireless communication system is provided. The method comprises identifying that at least one first SR is triggered, identifying whether each of the at least one first SR is triggered for beam failure recovery (BFR) of a secondary cell (SCell), and determining whether to cancel each of the at least one SR based on the identification.

20 Claims, 7 Drawing Sheets

Related U.S. Application Data (60) Provisional application No. 62/872,628, filed on Jul. 10, 2019.

(51) Int. Cl.

| | | |
|---|---|---|
| *H04W 72/044* | (2023.01) | |
| *H04W 16/28* | (2009.01) | |
| *H04W 28/02* | (2009.01) | |
| *H04W 80/02* | (2009.01) | |
| *H04W 72/23* | (2023.01) | |

(52) U.S. Cl.
CPC ......... *H04W 72/046* (2013.01); *H04W 72/23* (2023.01); *H04W 74/0808* (2013.01); *H04W 80/02* (2013.01)

(58) Field of Classification Search
CPC ... H04W 72/046; H04W 16/28; H04W 72/14; H04W 28/0278; H04W 80/02; H04W 72/1284; H04W 74/0833; H04W 72/04; H04W 72/12; H04W 76/00; H04J 2203/0069; H04Q 2213/394
See application file for complete search history.

(56) References Cited

U.S. PATENT DOCUMENTS

| | | | | |
|---|---|---|---|---|
| 2020/0145280 A1* | 5/2020 | Cirik | ................ | H04B 7/0695 |
| 2020/0267797 A1* | 8/2020 | Wei | ................ | H04B 7/0695 |

OTHER PUBLICATIONS

Qualcomm Inc., "Correction to SR procedure under beam failure", Change Request, 3GPP TSG-RAN WG2 #105, Feb. 25-Mar. 1, 2019, R2-1901763, 4 pages.

Nokia, Nokia Shanghai Bell, "Enhancements on Multi-beam Operation", 3GPP TSG RAN WG1 #97 Meeting, May 13-17, 2019, R1-1907317, 19 pages.

Vivo, "SR and BSR cancel due to Duplication deactivation", 3GPP TSG-RAN WG2 NR AH1807 meeting, Jul. 2-6, 2018, R2-1809887, 2 pages.

Intel Corporation, "Summary on SCell BFR and L1-SINR", 3GPP TSG RAN WG1 Meeting #96b, Apr. 8-12, 2019, R1-1905638, 22 pages.

Samsung Electronics R D Institute UK, "Finalising the design of SR and BSR triggering and cancellation mechanisms", 3GPP TSG-RAN WG2 #101, Feb. 26-Mar. 2, 2018, R2-1803866, 3 pages.

Abinader, Fuad, et al. "System-Level Analysis of mmWave 5G Systems with Different Multi-Panel Antenna Device Models," 2021, IEEE 93rd Vehicular Technology Conference (VTC2021-Spring). IEEE, 2021, (Year: 2021).

International Search Report dated Sep. 28, 2020 in connection with International Patent Application No. PCT/KR2020/009079, 2 pages.

Cai, Zhaoyun, and Dake Liu. "Baseband design for 5G UDN base stations: Methods and implementation," China Communications 14.5 (2017): 59-77, (Year: 2017).

* cited by examiner

METHOD AND APPARATUS FOR HANDLING SCHEDULING REQUEST (SR) CANCELLATION, RANDOM ACCESS (RA) PRIORITIZATION AND CONCURRENT OCCURRENCE OF BEAM FAILURE RECOVERY (BFR) ON PRIMARY CELL (PCELL) AND SECONDARY CELL (SCELL)

CROSS-REFERENCE TO RELATED APPLICATION

This application is a continuation of application Ser. No. 16/946,918, filed Jul. 10, 2020, now U.S. Pat. No. 11,251,855, which claims the benefit of Provisional Patent Application No. 62/872,628, filed on Jul. 10, 2019, the disclosures of which are incorporated by reference herein in their entirety.

BACKGROUND

1. Field

The disclosure relates to a method of handling scheduling request (SR) cancellation, random access (RA) prioritization and concurrent occurrence of beam failure recovery (BFR) on primary cell (PCell) and secondary cell (SCell).

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also referred to as a 'beyond 4G network' or a 'post long term evolution (LTE) System.' The 5G wireless communication system is considered to be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports the voice service and data service. The 4G wireless communication system has been developed to provide high-speed data service. However, the 4G wireless communication system currently suffers from lack of resources to meet the growing demand for high speed data services. Therefore, the 5G wireless communication system is being developed to meet the growing demand of various services with diverse requirements, e.g., high-speed data services, support ultra-reliability and low-latency applications.

In addition, the 5G wireless communication system is expected to address different use cases having quite different requirements in terms of data rate, latency, reliability, mobility etc. However, it is expected that the design of the air-interface of the 5G wireless communication system will be flexible enough to serve user equipments (UEs) having quite different capabilities depending on the use case and market segment in which the UE caters service to the end customer. Example use cases the 5G wireless communication system is expected to address includes enhanced mobile broadband (eMBB), massive machine type communication (m-MTC), ultra-reliable low-latency communication (URLL), etc. The eMBB requirements (e.g., tens of Gbps data rate, low-latency, high-mobility and so on) address the market segment representing the wireless broadband subscribers needing internet connectivity everywhere, all the time and on the go. The m-MTC requirements (e.g., very high connection density, infrequent data transmission, very long battery life, low mobility address and so on) address the market segment representing the IoT/IoE envisioning connectivity of billions of devices. The URLL requirements (e.g., very low latency, very high reliability variable mobility and so on) address the market segment representing the Industrial automation application and vehicle-to-vehicle/ vehicle-to-infrastructure communication that is foreseen as one of the enablers for autonomous cars.

In the 5G wireless communication system operating in higher frequency (mmWave) bands, UE and next generation node B (gNB) communicate with each other using beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit (TX) beam patterns of different directions. Each of these TX beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these RX beam patterns can be also referred as RX beam.

Typically, in a wireless communication network, UE can be in one of radio resource control (RRC) idle state or RRC connected state. A UE in RRC idle performs cell selection and reselection. In other words, the UE decides on which cell to camp. The RRC idle UE monitors a paging channel to detect incoming calls, and also acquires system information. The system information mainly consists of parameter by which network can control the cell (re)selection process. In RRC connected state, network allocates radio resources to the UE to facilitate the transfer of (unicast) data via shared data channels. To support this operation, the UE monitors an associated control channel used to indicate the dynamic allocation of the shared transmission resources in time and frequency. The UE provides the network with reports of its buffer status and of the downlink channel quality, as well as neighbor cell measurement information to enable network to select the most appropriate cell for the UE. In the RRC connected state, UE monitors the downlink (DL) subframes or transmission time interval (TTI) or slot for downlink control information (downlink control information can be transmitted using (enhanced) physical downlink control channel ((e)PDCCH)). Downlink control information can indicate whether the UE is scheduled in DL or uplink (UL).

If the UE is scheduled in DL, then UE decodes and receives the downlink packet using the received control information. If the UE is scheduled in UL, then UE uses the received control information to transmit the uplink packet. In a beamformed system, the downlink control information is transmitted by the base station (BS) using beamforming. BS supports multiple TX beams and transmits using one or more TX beams in subframe, TTI or time slot. UE monitors the subframes, TTIs or time slots for receiving downlink control information (i.e. PDCCH/ePDCCH). The one or more TX beams used by the BS to communicate with a UE are decided based on a beam management procedure which basically comprises of UE measuring the reference signals transmitted using multiple TX beams and reporting one or more suitable TX beams to the BS.

The 5G wireless communication system (also referred as next generation radio or NR), supports standalone mode of operation as well dual connectivity (DC). In DC, a multiple RX/TX UE may be configured to utilize resources provided by two different nodes (or node Bs (NBs)) connected via non-ideal backhaul. One node acts as the master node (MN) and the other as the secondary node (SN). The MN and SN are connected via a network interface and at least the MN is connected to the core network. NR also supports multi-radio access technology (RAT) DC (MR-DC) operation whereby a UE in RRC_CONNECTED is configured to utilize radio resources provided by two distinct schedulers, located in two different nodes connected via a non-ideal backhaul and providing either E-UTRA (i.e. if the node is an ng-eNB) or NR access (i.e. if the node is a gNB).

In NR for a UE in RRC_CONNECTED not configured with carrier aggregation (CA)/DC, there is only one serving cell comprising of the primary cell (PCell). For a UE in RRC_CONNECTED configured with CA/DC, the term 'serving cells' is used to denote the set of cells comprising of the Special Cell(s) (SpCell(s)) and all secondary cells (SCells).

In NR, the term master cell group (MCG) refers to a group of serving cells associated with the MN, comprising of the PCell and optionally one or more SCells. In NR, the term secondary cell group (SCG) refers to a group of serving cells associated with the SN, comprising of the primary SCell (PSCell) and optionally one or more SCells. In NR, PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of SpCell. PSCell refers to a serving cell in SCG in which the UE performs random access when performing the reconfiguration with synchronization procedure. For DC operation, the term SpCell refers to the PCell of the MCG or the PSCell of the SCG, otherwise (e.g., when DC is not configured) the term SpCell refers to the PCell.

In NR, the scheduling request (SR) is used for requesting UL-shared channel (SCH) resources for new transmission. The media access control (MAC) entity may be configured with zero, one, or more SR configurations. An SR configuration consists of a set of physical UL control channel (PUCCH) resources for SR across different bandwidth parts (BWPs) and cells. For a logical channel, at most one PUCCH resource for SR is configured per BWP. Each SR configuration corresponds to one or more logical channels. Each logical channel may be mapped to zero or one SR configuration, which is configured by RRC. The SR configuration of the logical channel that triggered the buffer state report (BSR) is considered as corresponding SR configuration for the triggered SR. RRC configures the following parameters for the SR procedure: sr-ProhibitTimer (per SR configuration); sr-TransMax (per SR configuration); and schedulingRequestId. schedulingRequestId identifies an SR configuration. schedulingRequestId of an SR configuration is included in logical channel configuration to map a logical channel with a specific SR configuration. UE maintains a variable SR_COUNTER per SR configuration. If an SR is triggered and there are no other SRs pending corresponding to the same SR configuration, the MAC entity shall set the SR_COUNTER of the corresponding SR configuration to 0.

The 5G wireless communication system supports a beam failure recovery (BFR) mechanism at UE for PCell or PSCell. This comprises of beam failure detection, new candidate beam identification, BFR request (BFRQ) transmission and monitoring response for BFRQ. UE monitors synchronization signals (SSs) or channel state information reference signals (CSI-RSs) transmitted periodically by the serving cell (PCell or PSCell) to assess if a beam failure trigger condition has been met and also to identify a new candidate beam. A beam failure is detected on a serving cell if number of consecutive detected beam failure instance exceeds a configured maximum number within a time interval given by beamFailureDetectionTimer. A beam failure instance means that all serving beams in a set of beams configured for beam failure detection fails (i.e. hypothetical physical DL control channel (PDCCH) block error rate (BLER) determined based on measurement of SS or CSI-RS is above a threshold). The set of beams for beam failure detection for a serving cell are configured via RRC message. A new candidate beam is the CSI-RS or SS block (SSB) of serving cell whose measured quality (e.g. reference signal received power (RSRP)) is above a configured threshold.

After detecting beam failure on SpCell, UE initiates random access procedure on SpCell for beam recovery. UE also starts the starts beamFailureRecoveryTimer, if configured. SpCell refers to PCell for MCG and PSCell for SCG. Otherwise (e.g., when DC is not configured), the term SpCell refers to the PCell. UE selects contention free (dedicatedly signaled to UE) physical random access channel (PRACH) occasion and/or preamble corresponding to SpCell's new candidate beam and transmits the preamble. UE then starts the bfr-ResponseWindow at the start of the first PDCCH occasion after a fixed duration of X symbols from the end of the preamble transmission. bfr-ResponseWindow is the RAR response window configured by gNB for BFR. UE monitors the PDCCH of the SpCell for response to BFRQ identified by the cell radio network temporary identifier (C-RNTI) while bfr-ResponseWindow is running. If UE receives a PDCCH transmission addressed to the C-RNTI from the SpCell, UE considers the BFR procedure successfully completed and beamFailureRecoveryTimer is stopped. If the bfr-ResponseWindow is expired, UE performs 1) selecting PRACH occasion and/or preamble, 2) transmitting the preamble and 3) monitoring the PDCCH again. If the bfr-ResponseWindow is expired and UE has already transmitted PRACH preamble for configured number of times, BFRQ procedure is considered unsuccessful and UE may trigger radio link failure. If beamFailureRecoveryTimer is expired and BFRQ procedure is not successfully completed, UE stops using the contention free random access resources configured for BFR.

UE may be configured with secondary serving cell(s) in addition to SpCell. Beam management for SCell typically consists of following steps:

Receiving information by UE from gNB for SCell's beam failure detection and recovery Detecting beam failure by UE. Triggering BFR.

Triggering SR for BFR by UE if UL grant is not available; gNB allocating UL grant upon receiving SR for BFR MAC CE generation for BFR by UE. MAC CE includes serving cell identifier (ID) of SCell (explicitly wherein MAC CE includes serving cell ID field or implicitly wherein MAC CE includes a bitmap and each bit in bitmap corresponding to a serving cell) for which BFR is requested, candidate beam (SSB/CSI-RS) info, etc. The BFR MAC CE can be a truncated BFR MAC CE or a regular (i.e. non-truncated) BFR MAC CE. Regular (i.e. non-truncated) BFR MAC CE indicates the SCell(s) for which beam failure is detected and includes BFR information (i.e. candidate beam information, candidate beam is available or not, etc.) for each failed SCell (i.e. SCell for which beam failure is detected) indicated in BFR MAC CE; whereas truncated BFR MAC CE indicates the SCell(s) for which beam failure is detected and can skip (depending on size of UL grant available) BFR information for one or more failed SCells indicated in BFR MAC CE.

Transmitting generated MAC control element (CE) for BFR by UE in received UL grant gNB activating one or more beams (SSBs/CSI-RSs) based on the received MAC CE for BFR.

Upon detecting beam failure for an SCell, UE triggers BFR for that SCell. UE further triggers SR for BFR if UL grant is not available for transmitting BFR MAC CE for SCell BFR. SR information for SCell BFR consists of one or more SR identifiers for SCell BFR. If multiple SRs are linked (SR information for SCell BFR includes multiple SR identifiers) with the BFR for the SCell, multiple SRs are triggered simultaneously. SR information for SCell BFR is configured as follows:

SR information for SCell's BFR is signaled per BWP. SR information may or may not be signaled for each configured BWP of SCell. For SCell's BFR, UE uses SR information in BWP configuration of the active BWP of that SCell. beamFailureRecoveryConfigSCell IE can be defined and included in dedicated BWP configuration wherein the beamFailureRecoveryConfigSCell IE includes SR information.

Alternately SR information for SCell's BFR is signaled per SCell. For SCell's BFR, UE uses SR information corresponding to that SCell.

Alternately SR information for SCell's BFR is signaled per cell group. For SCell's BFR, UE uses SR information in configuration of cell group (MCG or SCG) to which that SCell belong.

If SR information for SCell's BFR is not signaled, all SR resource configurations configured in cell group of that SCell can be used by UE for that SCell's BFR.

SR identifier for BFR identifies the SR configuration to be used for SCell BFR. A list of SR configurations is configured per cell group via RRC message. SR identifier (schedulingRequestId) associated with each SR configuration is signaled by gNB. A SR configuration includes value of sr-ProhibitTimer and sr-TransMax and schedulingRequestId. The list of SR configuration can be same for BFR on SCell and for other events triggering SR. SR identifier for BFR identifies the SR configuration from this list. The list of SR configuration can be separately configured for BFR on SCell and for other events triggering SR. SR identifier for BFR identifies the SR configuration from the list of SR configuration configured for BFR. An example of a list of SR configurations (SchedulingRequestConfig) according to abstract syntax notation one (ASN.1) syntax is as follows:

```
  schedulingRequestConfig                    SchedulingRequestConfig
SchedulingRequestConfig ::=                  SEQUENCE {
    schedulingRequestToAddModList              SEQUENCE (SIZE (1..maxNrofSR-
ConfigPerCellGroup)) OF SchedulingRequestToAddMod
}
SchedulingRequestToAddMod ::=                SEQUENCE {
    schedulingRequestId                      SchedulingRequestId,
    sr-ProhibitTimer                         ENUMERATED {ms1, ms2, ms4, ms8, ms16, ms32,
ms64, ms128}
    sr-TransMax                              ENUMERATED { n4, n8, n16, n32, n64, spare3,
spare2, spare1}
}
```

SR identifier also identifies the SR resource configuration to be used for BFR. SR resource configuration indicates the physical layer resources on PUCCH which are used for transmitting SR. A list of SR resource configuration is configured (i.e. signaled by gNB) per BWP of serving cell(s) supporting PUCCH. SR identifier associated with a SR resource configuration is signaled by gNB. The list of SR resource configuration can be same for BFR on SCell and for other events triggering SR. SR identifier for BFR identifies the SR resource configuration from this list. The list of SR resource configuration can be separately configured for BFR on SCell and for other events triggering SR. SR identifier for BFR identifies the SR resource configuration from the list of SR resource configuration configured for BFR. An example of a list of SR resource configurations (schedulingRequestResourceToAddModList) according to ASN.1 syntax is as follows:

```
schedulingRequestResourceToAddModList         SEQUENCE (SIZE (1..maxNrofSR-
Resources)) OF SchedulingRequestResourceConfig
    SchedulingRequestResourceConfig ::=          SEQUENCE {
        schedulingRequestResourceId              SchedulingRequestResourceId,
        schedulingRequestID                      SchedulingRequestId,
        periodicityAndOffset                     CHOICE {
            sym2                                 NULL,
            sym6or7                              NULL,
            sl1                                  NULL,
            sl4                                  INTEGER (0..3),
            sl5                                  INTEGER (0..4),
            sl8                                  INTEGER (0..7),
            sl10                                 INTEGER (0..9),
            sl16                                 INTEGER (0..15),
            sl20                                 INTEGER (0..19),
            sl40                                 INTEGER (0..39),
            sl80                                 INTEGER (0..79),
            sl160                                INTEGER (0..159),
            sl320                                INTEGER (0..319),
            sl640                                INTEGER (0..639)
        }
        resource                                 PUCCH-ResourceId
}
```

SR configuration and SR resource configuration identified by the SR identifier included in the SR information for SCell's BFR are used by the UE for transmitting SR for SCell BFR. In case SR resource configuration corresponding to SR identifier is available on multiple serving cells (e.g. SpCell and PUCCH SCell), UE can use both for transmitting SR for BFR.

In the existing system, SR is triggered when regular BSR needs to be transmitted by UE. All pending SR(s), triggered prior to the MAC protocol data unit (PDU) assembly are cancelled and each respective sr-ProhibitTimer is stopped when the MAC PDU is transmitted and this PDU includes a long or short BSR MAC CE which contains buffer status up to (and including) the last event that triggered a BSR prior to the MAC PDU assembly. Multiple SRs can be pending wherein some SRs are triggered for BSR and others are triggered for SCell BFR. A MAC PDU is transmitted which may include long or short BSR MAC CE, but the MAC PDU may not include BFR MAC CE. As per current cancellation condition, all pending SRs are cancelled. Cancelling SR triggered for SCell BFR is not desirable and will delay the SCell BFR. SR cancellation method needs to be enhanced.

While BFR for SpCell is ongoing, SCell BFR may be triggered. Issue is that while random access on SpCell is ongoing, whether to generate MAC CE and/or trigger SR for SCell BFR or not. In another scenario, while BFR for SCell is ongoing, SpCell BFR may be triggered. Issue is whether to terminate SCell BFR or not. So, a method to handle concurrent occurrence of SCell and SpCell BFR is needed.

The above information is presented as background information only, and to assist with an understanding of the disclosure. No determination has been made, and no assertion is made, as to whether any of the above might be applicable as prior art with regard to the disclosure.

SUMMARY

Cancelling scheduling request (SR) triggered for beam failure recovery (BFR) on secondary cell (SCell) is not desirable. SR cancellation method needs to be enhanced.

While BFR for special cell (SpCell) is ongoing, SCell BFR may be triggered. Issue is that while random access on SpCell is ongoing, whether to generate media access control (MAC) control element (CE) and/or trigger SR for SCell BFR or not. In another scenario, while BFR for SCell is ongoing, SpCell BFR may be triggered. Issue is whether to terminate SCell BFR or not. So, a method to handle concurrent occurrence of SCell and SpCell BFR is needed.

Aspects of the disclosure are to address at least the above-mentioned problems and/or disadvantages and to provide at least the advantages described below. Accordingly, an aspect of the disclosure is to provide a communication method and system for converging a 5$^{th}$ generation (5G) communication system for supporting higher data rates beyond a 4$^{th}$ generation (4G) system.

In accordance with an aspect of the disclosure, a method performed by a terminal for handling SR cancellation in a wireless communication system is provided. The method comprises identifying that at least one first SR is triggered, identifying whether each of the at least one first SR is triggered for BFR of a SCell, and determining whether to cancel each of the at least one SR based on the identification.

In accordance with another aspect of the disclosure, a terminal in a wireless communication system is provided. The terminal includes a transceiver and at least one processor operatively coupled with the transceiver. The at least one processor is configured to identify that at least one first SR is triggered, identify whether each of the at least one first SR is triggered for BFR of a SCell, and determine whether to cancel each of the at least one SR based on the identification.

Additional aspects will be set forth in part in the description which follows and, in part, will be apparent from the description, or may be learned by practice of the presented embodiments.

SR cancellation method is enhanced.

Concurrent occurrence of SCell and SpCell BFR can be handled.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

SR Cancellation:

When a scheduling request (SR) is triggered, the SR is considered as pending until the SR is cancelled.

Figure 1:
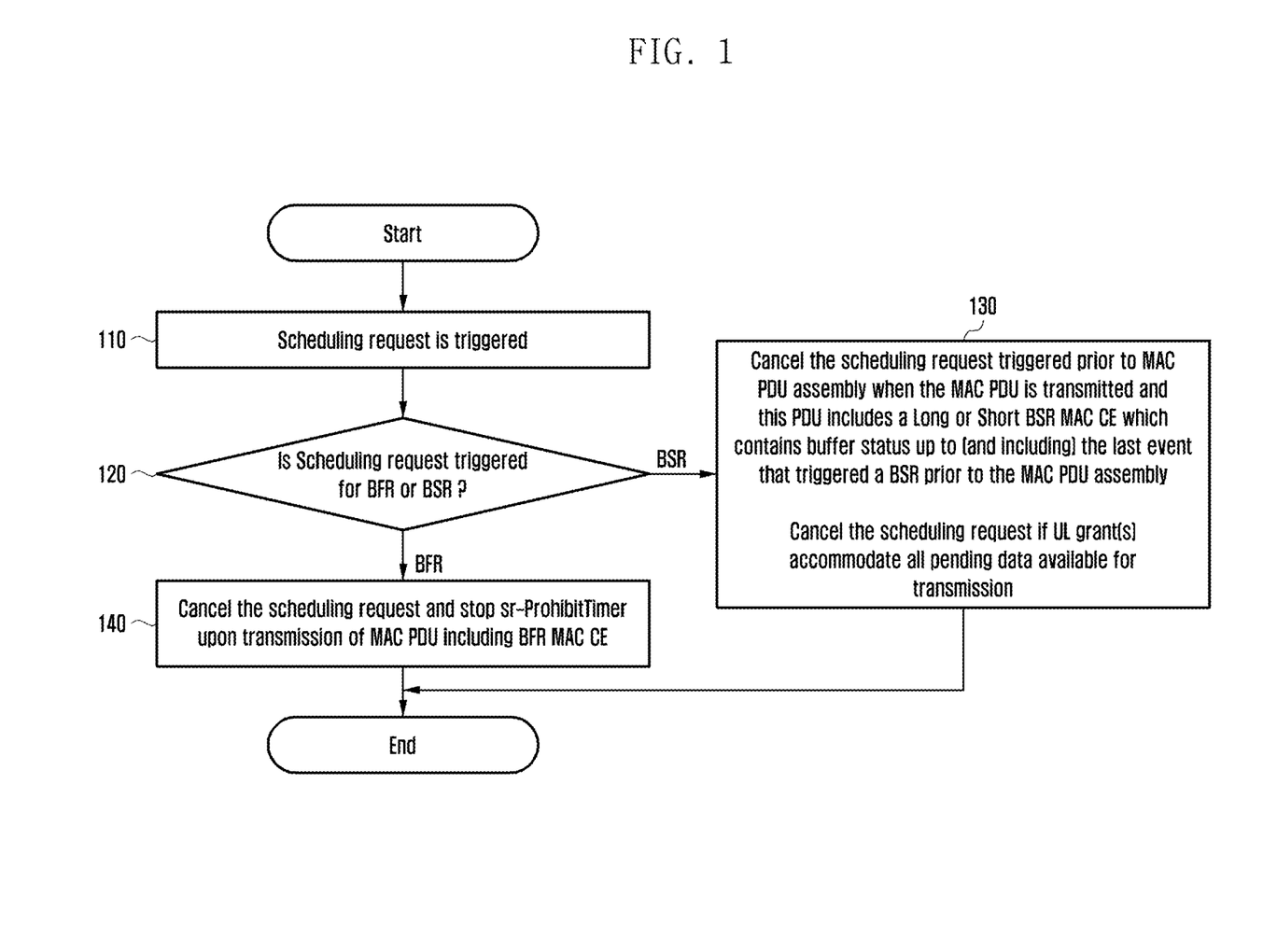
FIG. 1 shows scheduling request (SR) cancellation procedure considering both buffer status report (BSR) triggered SR and beam failure recovery (BFR) triggered SR according to an embodiment of the disclosure.

FIG. 1 shows SR cancellation procedure considering both buffer status report (BSR) triggered SR and beam failure recovery (BFR) triggered SR according to an embodiment of the disclosure.

Referring to FIG. 1, if SR is triggered and is pending at operation 110, a UE determines whether the SR is triggered for BFR or BSR at operation 120.

If the SR is not triggered for BFR (i.e. if SR is triggered for BSR) and the SR is triggered prior to media access control (MAC) protocol data unit (PDU) assembly, the UE cancels this SR when the MAC PDU is transmitted and this PDU includes a long or short BSR MAC control element (CE) which contains buffer status up to (and including) the last event that triggered a BSR prior to the MAC PDU assembly, or the UE cancels the SR when UL grant(s) accommodate all pending data available for transmission at operation 130.

If there are multiple SR(s) pending, all pending SR(s) except the SR triggered for BFR (or for BFR request (BFRQ) or for BFR/BFRQ of secondary cell (SCell)), triggered prior to the MAC PDU assembly are cancelled and each respective sr-ProhibitTimer are stopped when the MAC PDU is transmitted and this PDU includes a long or short BSR MAC CE which contains buffer status up to (and including) the last event that triggered a BSR prior to the MAC PDU assembly.

If there are multiple SR(s) pending, all pending SR(s) except the SR triggered for BFRQ are cancelled and each respective sr-ProhibitTimer are stopped when the UL grant(s) can accommodate all pending data available for transmission.

If the SR is triggered for BFR of a SCell and this SR is pending (i.e. not yet cancelled), the UE cancels the SR and stops the corresponding sr-ProhibitTimer upon transmission of MAC PDU including BFR MAC CE (or truncated BFR MAC CE) containing BFR information of that SCell at operation 140. The BFR information of SCell includes one or more of the following information: candidate beam information, candidate beam is available or not, etc.

SR triggered for BFR (or for BFRQ or for BFR/BFRQ of SCell) is cancelled and corresponding sr-ProhibitTimer is stopped when the MAC PDU is transmitted and this MAC PDU includes BFR MAC CE. The BFR MAC CE includes BFR information for SCell that triggered SR. It is to be noted that SR cancellation is triggered prior to MAC PDU assembly.

SR triggered for BFR (or for BFRQ or for BFR/BFRQ of SCell) is cancelled and corresponding sr-ProhibitTimer is stopped, if SCell for which BFR is ongoing is deactivated (in other words SCell for which SR was triggered for BFR is deactivated).

SR triggered for BFR (or for BFRQ or for BFR/BFRQ of SCell) is cancelled upon SR failure (i.e. SR counter reaches sr-TransMax).

Figure 2:
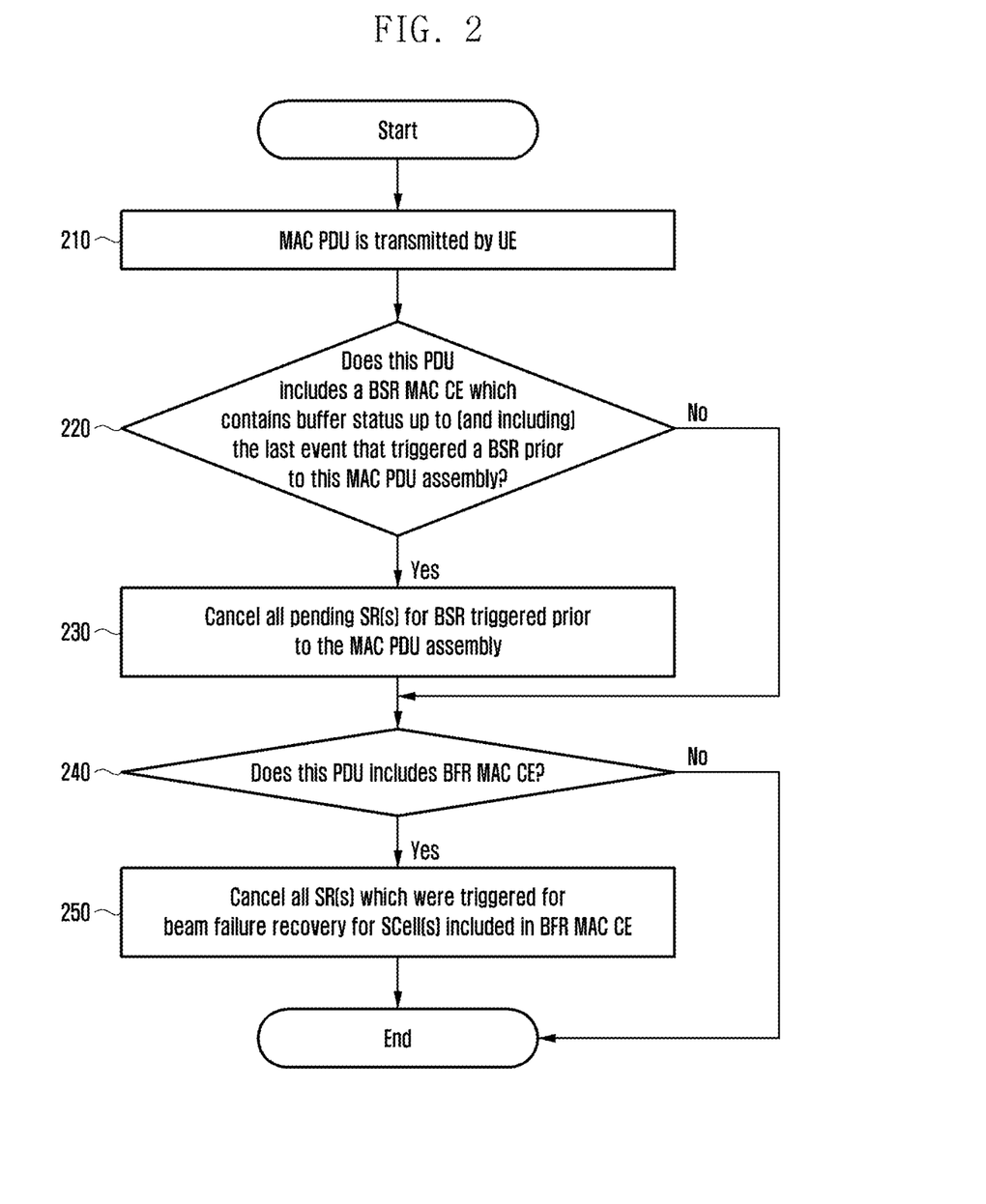
FIG. 2 is another illustration of SR cancellation procedure according to another embodiment of this disclosure.

FIG. 2 is another illustration of SR cancellation procedure according to another embodiment of this disclosure.

Referring to FIG. 2, upon transmission of MAC PDU at operation 210, UE checks whether this PDU includes a long or short BSR MAC CE which contains buffer status up to (and including) the last event that triggered a BSR prior to the MAC PDU assembly of the transmitted MAC PDU at operation 220. MAC PDU is transmitted in UL grant wherein the UL grant can be a configured UL grant or dynamic UL grant. If yes, all pending SR(s) for BSR, triggered prior to the MAC PDU assembly are cancelled and each respective sr-ProhibitTimer is stopped at operation 230. In one embodiment, this check is performed by UE if there is at least one pending SR for BSR (other than those triggered for BFR).

Upon transmission of MAC PDU, UE also checks whether this PDU includes BFR MAC CE at operation 240. If yes, UE cancels all pending SR(s) triggered prior to MAC PDU assembly which were triggered for BFR for SCell(s) whose BFR information is included in BFR MAC CE at operation 250. In one embodiment, this check is performed if there is at least one SR triggered for BFR is pending.

Fallback to Random Access Procedure for SCell BFR:

In one embodiment of this disclosure, if SR resources are not configured for BFR of an SCell, UE initiates random access procedure on SpCell. In another embodiment of this disclosure, if SR resources are configured for BFR of an SCell, upon SR failure (i.e., SR counter reaches sr-TransMax) of SR triggered for BFR of that SCell, UE initiates random access procedure on SpCell.

Figure 3:
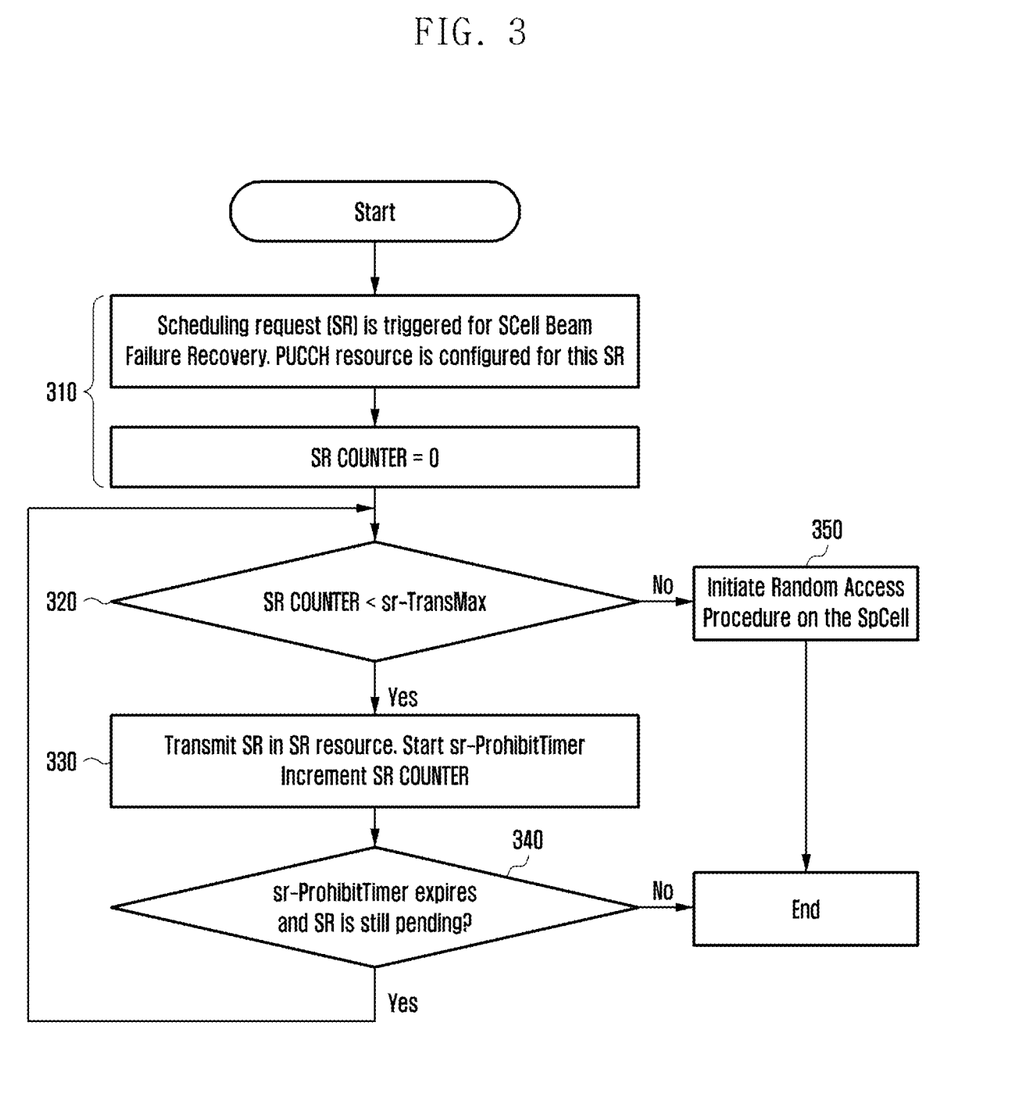
FIG. 3 shows fallback to random access procedure for secondary cell (SCell) BFR according to an embodiment of the disclosure.

FIG. 3 shows fallback to random access procedure for SCell BFR according to an embodiment of the disclosure.

Referring to FIG. 3, if SR is triggered for SCell BFR and PUCCH resource is configured for this SR, UE sets SR counter to 0 at operation 310. If the SR counter is smaller than sr-TransMax, the UE transmits the SR in SR resource, starts sr-ProhibitTimer, and increments the SR counter at operation 330. If the SR is not pending when sr-ProhibitTimer expires, the procedure ends. If the SR is still pending when sr-ProhibitTimer expires at operation 340, the UE determines whether the SR counter is smaller than sr-TransMax at operation 320. If the SR counter is not smaller than sr-TransMax, i.e., the SR counter reaches sr-TransMax, the UE initiates random access procedure on the SpCell at operation 350.

For this random access procedure on SpCell initiated for BFR of SCell, random access prioritization can be applied as follows: In BeamFailureRecoveryConfig IE for SCell, gNB can optionally signal ra-Prioritization IE wherein the IE includes at least one of powerRampingStepHighPriority and scalingFactorBI. powerRampingStepHighPriority is typically configured higher than powerRampingStep to prioritize random access. If random access was initiated on SpCell for an SCell's BFR RA prioritization parameters for that SCell can be applied to random access on SpCell.

If powerRampingStepHighPriority is configured in the beamFailureRecoveryConfig IE for that SCell UE sets PREAMBLE_POWER_RAMPING_STEP to the powerRampingStepHighPriority. Else the UE sets PREAMBLE_POWER_RAMPING_STEP to powerRampingStep. powerRampingStep is configured in random access channel (RACH) configuration of SpCell.

If scalingFactorBI is configured in the beamFailureRecoveryConfig IE for that SCell, UE sets SCALING_FACTOR_BI to the scalingFactorBI. Else the UE sets SCALING_FACTOR_BI to 1.

During the preamble transmission on SpCell, UE sets PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP.

If the backoff indication (BI) is received during random access procedure, UE sets the PREAMBLE_BACKOFF to value of the BI field of the MAC subPDU, multiplied with SCALING_FACTOR_BI. If UE fails to receive random access response (RAR) in RAR window or if contention resolution timer expires, UE selects a random backoff time according to a uniform distribution between 0 and the PREAMBLE_BACKOFF.

Figure 4:
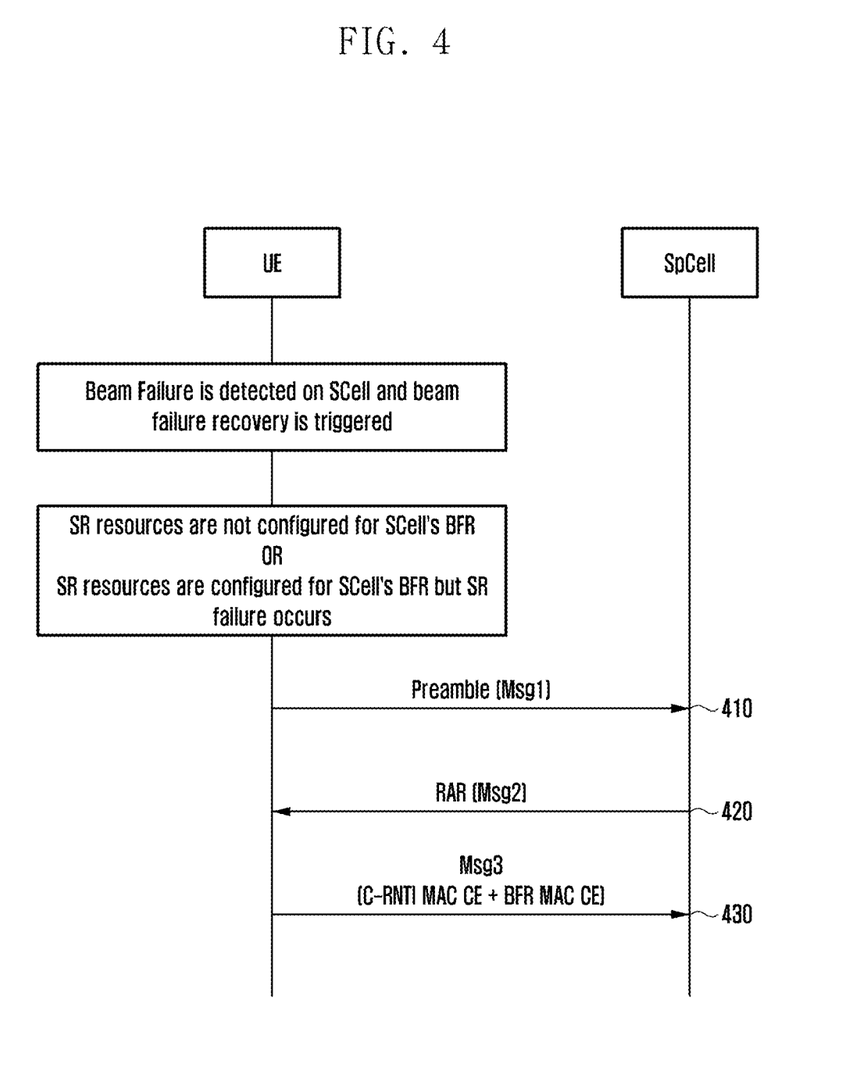
FIG. 4 shows signaling flows between a user equipment (UE) and a next generation node B (gNB) controlling special cell (SpCell) for contention based random access procedure on SpCell for BFR of SCell according to an embodiment of the disclosure.

FIG. 4 shows signaling flows between a UE and a gNB controlling SpCell for contention based random access procedure on SpCell for BFR of SCell according to an embodiment of the disclosure.

Referring to FIG. 4, if beam failure is detected on SCell and BFR is triggered, and SR resources are not configured for SCell's BFR or SR resource are configured for SCell's BFR but SR failure occurs, a UE transmits a preamble in a message 1 (Msg1) to a gNB controlling a SpCell at operation 410. The gNB transmits an RAR in a message 2 (Msg2) to the UE at operation 420. The UE transmits a message 3 (Msg3) to the gNB at operation 430. The Msg3 includes cell radio network temporary identifier (C-RNTI) MAC CE and BFR MAC CE, i.e., BFR MAC CE is transmitted in uplink (UL) grant received in the RAR. If regular BFR MAC CE cannot be included in UL grant received in RAR because of size of UL grant, UE can transmit truncated BFR MAC CE. Regular BFR MAC CE indicates the SCell(s) for which beam failure is detected and includes BFR information (i.e. candidate beam information, candidate beam is available or not, etc.) for each failed SCell (i.e. SCell for which beam failure is detected) indicated in BFR MAC CE, whereas truncated BFR MAC CE indicates the SCell(s) for which beam failure is detected and can skip (depending on size of UL grant available) BFR information for one or more failed SCells indicated in BFR MAC CE.

Figure 5:
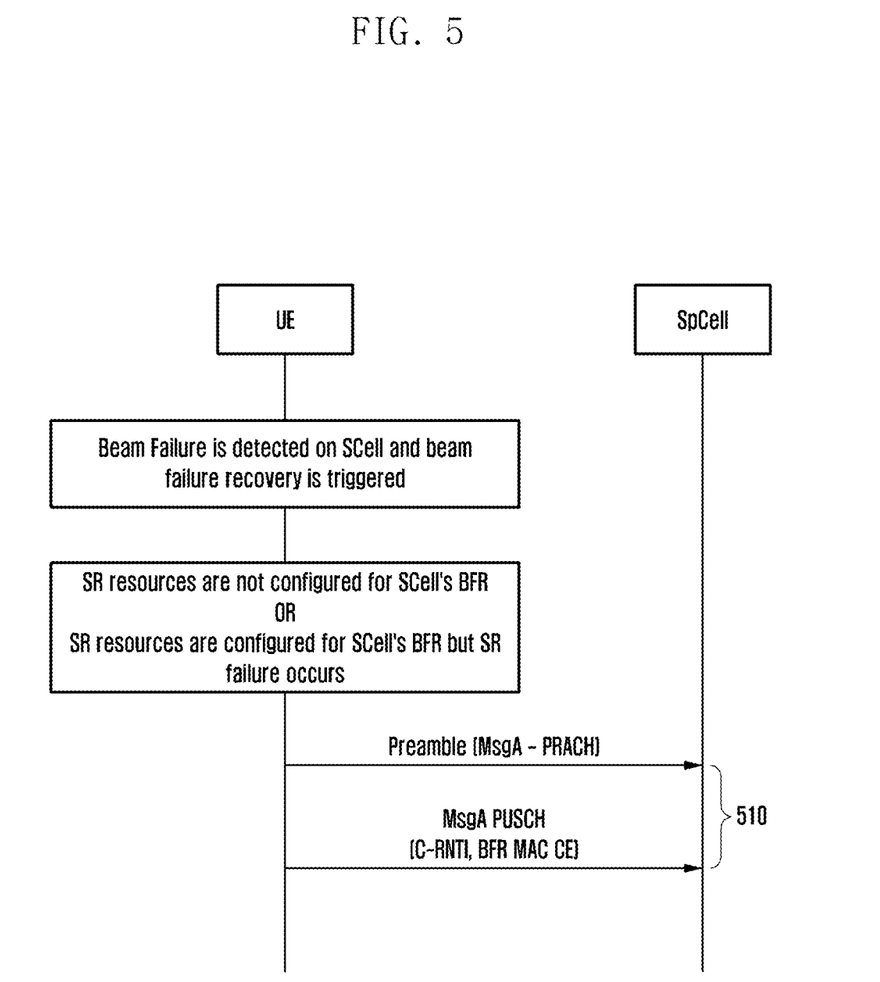
FIG. 5 shows signaling flows between a UE and a gNB controlling SpCell for 2 step random access procedure on SpCell for BFR of SCell according to an embodiment of the disclosure.

FIG. 5 shows signaling flows between a UE and a gNB controlling SpCell for 2 step random access procedure on SpCell for BFR of SCell according to an embodiment of the disclosure.

In case 2 step RACH resources are configured on SpCell, BFR MAC CE can be included in a message A (MsgA) as shown in FIG. 5. If beam failure is detected on SCell and BFR is triggered, and SR resources are not configured for SCell's BFR or SR resource are configured for SCell's BFR but SR failure occurs, a UE transmits a preamble on MsgA-physical random access channel (PRACH), and C-RNTI and BFR MAC CE on MsgA physical UL shared channel (PUSCH) to a gNB controlling a SpCell at operation 510.

If random access procedure triggered for SCell BFR is ongoing and UE is able to transmit BFR MAC CE in UL grant (other than UL grant received in RAR) wherein BFR MAC CE includes BFR information for that SCell, random access procedure is stopped. If random access procedure triggered for a SCell BFR is ongoing and if UE receives deactivation command MAC CE deactivating that SCell, random access procedure is stopped.

Concurrent Occurrence of BFR for SpCell and SCell:

Scenario 1: BFR for SpCell is ongoing, SCell BFR is triggered.

In one method of this disclosure, upon detection of beam failure for a SCell while the BFR for SpCell is ongoing, UE performs the following operation:

UE generates BFR MAC CE for SCell BFR.

UE does not trigger SR for SCell BFR.

BFR MAC CE can be transmitted in UL grant received in RAR during ongoing random access procedure for BFR of SpCell, if possible. Depending on size of UL grant, prioritization of data available for other MAC CEs and logical channels, it may or may not be possible to transmit BFR MAC CE in UL grant.

Upon completion of random access procedure for BFR of SpCell, UE checks if BFR MAC CE for SCell BFR is transmitted or not. If BFR MAC CE for SCell BFR is not yet transmitted, UE triggers SR for SCell BFR.

In one method of this disclosure, upon detection of beam failure for a SCell, UE checks whether BFR for SpCell is ongoing or not. If BFR for SpCell is not ongoing, BFR MAC CE for SCell BFR is generated and SR for SCell BFR is triggered. If BFR for SpCell is ongoing, BFR MAC CE for SCell BFR is generated and SR for SCell BFR is not triggered.

In one method of this disclosure, upon completion of random access procedure for BFR of SpCell, UE checks if BFR for SCell was triggered while this random access procedure for BFR of SpCell was ongoing. If yes, UE checks if BFR MAC CE for SCell BFR is pending for transmission or not. If pending, SR for SCell BFR is triggered.

In an alternate embodiment, upon completion of random access procedure for BFR of SpCell, UE checks if BFR MAC CE for SCell BFR is pending for transmission or not. If pending, SR for SCell BFR is triggered if there is no pending SR for SCell BFR.

Scenario 2: BFR for SCell is ongoing, SpCell BFR is triggered.

In one method of this disclosure, upon detection of beam failure for a SpCell while the BFR for SCell is ongoing:

Case 2-1: If SR transmission is on-going for SCell BFR, UE perform the following:

SR procedure for SCell BFR is aborted and random access procedure is triggered for SpCell BFR.

BFR MAC CE for SCell BFR can be transmitted in UL grant received in RAR during ongoing RA for BFR of SpCell, if possible. Depending on size of UL grant, prioritization of data available for other MAC CEs and logical channels, it may or may not be possible to transmit BFR MAC CE in UL grant.

Upon completion of random access procedure for BFR of SpCell, if BFR MAC CE for SCell BFR is not yet transmitted, SR for SCell BFR is triggered.

Case 1-2: If UL grant was already received and BFR MAC CE transmission is on-going If PUSCH transmission and RACH procedure can be done simultaneously, UE performs them together. Otherwise, the UE aborts BFR MAC CE transmission and triggers random access procedure for SpCell BFR Upon completion of random access procedure for BFR of SpCell, if BFR MAC CE for SCell BFR is not yet transmitted, SR for SCell BFR is triggered.

Scenario 3: Contention based random access (CBRA) is used for SCell BFR (e.g. when SR is not configured or SR failure case). When CBRA for SCell is triggered, a random access procedure may already be ongoing.

In one method of this disclosure, it is proposed the following operations for this scenario:

If ongoing RA procedure is for BFR on SpCell or initiated by physical downlink control channel (PDCCH) order, UE generates MAC CE for SCell BFR and continues ongoing RA procedure. Upon completion of RA procedure, the UE initiates CBRA for SCell, if BFR MAC CE for SCell is not yet transmitted.

Else if ongoing RA procedure is for other reasons:

if RA prioritization parameters are configured for BFR on SCell, UE aborts current RA procedure and initiates RA procedure for SCell BFR.

else upon completion of RA procedure, UE initiates CBRA for SCell, if BFR MAC CE for SCell is not yet transmitted.

Prioritization Between SR Transmission and UL Shared Channel (SCH) Transmission:

In the existing system, SR transmission has lower priority compared to UL SCH transmission. In case SR transmission occasion overlaps with UL-SCH transmission resource, SR transmission is not performed. This is reasonable in the current design as SR is used for requesting UL SCH resource. However, in case SR is used for BFR, it is beneficial to prioritized SR transmission compared to UL SCH transmission for fast BFR. In one method of this disclosure, in case of SR triggered for BFR, if SR transmission occasion overlaps with UL-SCH transmission resource, SR transmission is performed and UL-SCH transmission is not performed. In case of SR triggered for BSR, if SR transmission occasion overlaps with UL-SCH transmission resource, SR transmission is not performed and UL-SCH transmission is performed.

Prioritization Between SR Transmission and Measurement Gap:

In the existing system SR transmission has lower priority compared to measurement gap. In case SR transmission occasion overlaps with measurement gap, SR transmission is not performed. This is reasonable in the current design as SR is used for requesting UL SCH resources. However, in case SR is used for BFR, it is beneficial to prioritized SR transmission compared to measurement gap for fast BFR. In one method of this disclosure, in case of SR triggered for BFR, if SR transmission occasion overlaps with measurement gap, SR transmission is performed. In case of SR triggered for BSR, if SR transmission occasion overlaps with measurement gap, SR transmission is not performed.

Figure 6:
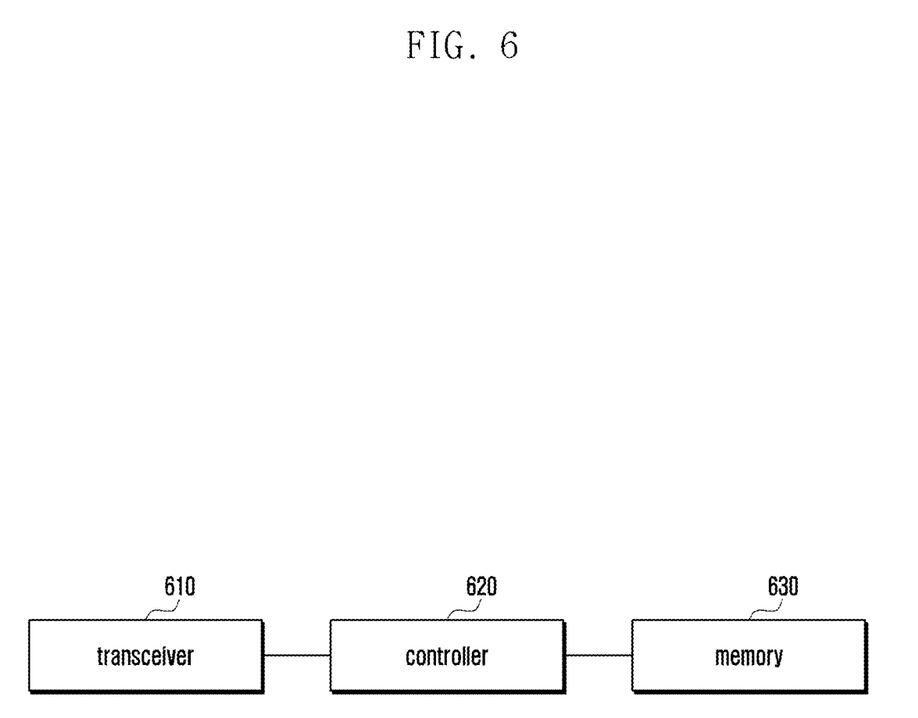
FIG. 6 illustrates a block diagram of a terminal according to an embodiment of the disclosure.

FIG. 6 is a block diagram of a terminal according to an embodiment of the disclosure.

Referring to FIG. 6, a terminal includes a transceiver 610, a controller 620 and a memory 630. The controller 620 may refer to a circuitry, an ASIC, an FPGA, or at least one processor. The transceiver 610, the controller 620 and the memory 630 are configured to perform the operations of the UE illustrated in the figures, e.g., FIGS. 1 to 5, or as otherwise described above. Although the transceiver 610, the controller 620 and the memory 630 are shown as separate entities, they may be integrated onto a single chip. The transceiver 610, the controller 620 and the memory 630 may also be electrically connected to or coupled with each other.

The transceiver 610 may transmit and receive signals to and from other network entities, e.g., a base station.

The controller 620 may control the UE to perform functions according to the embodiments described above. For example, the controller 620 is configured to identify that at least one SR is triggered and identify whether each of the at least one SR is triggered for BFR of a SCell. The controller 620 may be configured to cancel all pending SR(s) for BSR except for SCell BFR, triggered prior to the MAC PDU assembly and stop each respective sr-ProhibitTimer when the MAC PDU is transmitted and this PDU includes a long or short BSR MAC CE which contains buffer status up to (and including) the last event that triggered a BSR prior to the MAC PDU assembly. The controller 620 may be configured to cancel all pending SR(s) for BSR except the SR triggered for BFR and stop each respective sr-ProhibitTimer when the UL grant(s) can accommodate all pending data available for transmission. The controller 320 may be configured to cancel SR triggered for BFR when the MAC PDU is transmitted and this MAC PDU includes SCell BFR MAC CE or truncated SCell BFR MAC CE which contains BFR information of that SCell. The controller 320 may be configured to cancel all the triggered BFSs for the SCell if the SCell is deactivated. If SR is triggered for BFR and if SR resources are not configured for BFR of an SCell, the controller 320 may be configured to initiate random access procedure on SpCell. The controller 320 may be configured to stop the ongoing random access procedure due to a pending SR for BFR of a SCell when the MAC PDU is transmitted using a UL grant other than a UL grant provided by RAR and this PDU contains a SCell BFR MAC CE or truncated SCell BFR MAC CE which includes BFR information of that SCell.

In an embodiment, the operations of the terminal may be implemented using the memory 630 storing corresponding program codes. Specifically, the terminal may be equipped with the memory 630 to store program codes implementing desired operations. To perform the desired operations, the controller 620 may read and execute the program codes stored in the memory 630 by using a processor or a central processing unit (CPU).

Figure 7:
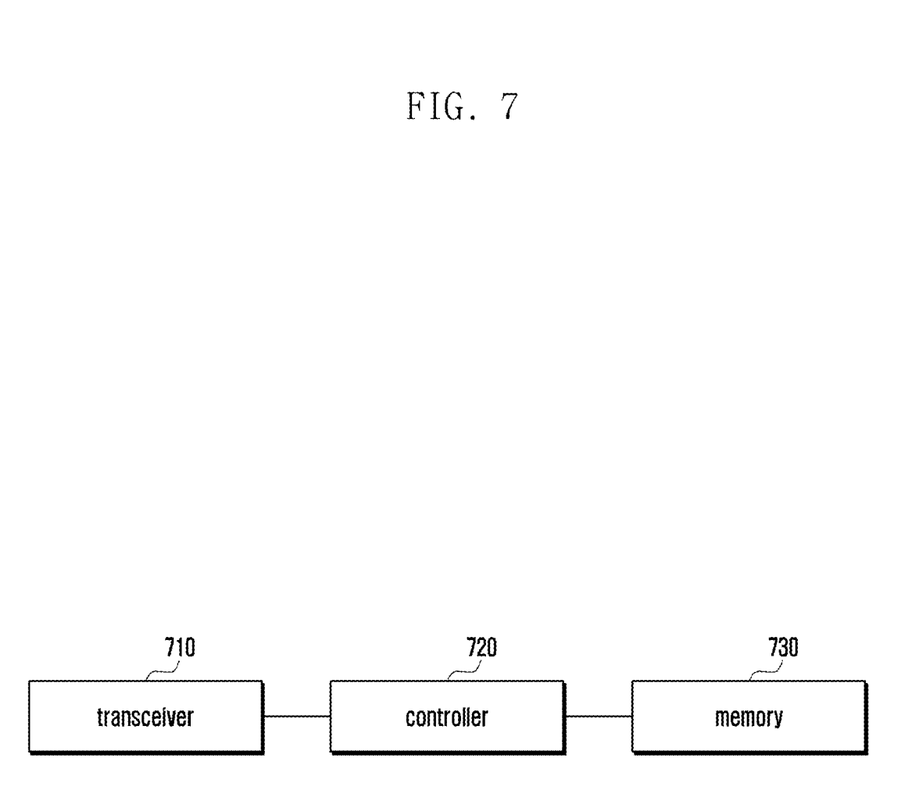
FIG. 7 illustrates a block diagram of a base station according to an embodiment of the disclosure.

FIG. 7 is a block diagram of a base station according to an embodiment of the disclosure.

Referring to FIG. 7, a base station includes a transceiver 710, a controller 720 and a memory 730. The controller 720 may refer to a circuitry, an ASIC, an FPGA, or at least one processor. The transceiver 710, the controller 720 and the memory 730 are configured to perform the operations of the gNB (or network, SpCell, SCell, etc.) illustrated in the figures, e.g. FIGS. 4 and 5, or as otherwise described above. Although the transceiver 710, the controller 720 and the memory 730 are shown as separate entities, they may be integrated onto a single chip. The transceiver 710, the controller 720 and the memory 730 may also be electrically connected to or coupled with each other.

The transceiver 710 may transmit and receive signals to and from other network entities, e.g., a terminal.

The controller 720 may control the gNB to perform functions according to the embodiments of the disclosure.

In an embodiment, the operations of the base station may be implemented using the memory 730 storing corresponding program codes. Specifically, the base station may be equipped with the memory 730 to store program codes implementing desired operations. To perform the desired operations, the controller 720 may read and execute the program codes stored in the memory 730 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    triggering a scheduling request (SR);
    identifying whether the SR is triggered for a buffer status report (BSR);
    in case that the SR is not triggered for the BSR, identifying whether the SR is triggered for a beam failure recovery (BFR) of a secondary cell (SCell); and
    cancelling the SR, in case that the SR is triggered for the BFR of the SCell and a medium access control (MAC) protocol data unit (PDU) including a BFR MAC control element (CE) is transmitted, the BFR MAC CE containing beam failure recovery information for the SCell.

2. The method of claim 1, further comprising:
    cancelling the SR, in case that the SR is triggered for the BSR prior to a MAC PDU assembly and a MAC PDU including a BSR MAC CE is transmitted, the BSR MAC CE containing buffer status up to a last event that triggered the BSR prior to the MAC PDU assembly.

3. The method of claim 1, further comprising:
    cancelling the SR, in case that the SR is triggered for the BFR of the SCell and the SCell is deactivated.

4. The method of claim 1, further comprising:
    stopping an SR prohibit timer corresponding to the cancelled SR.

5. The method of claim 1, further comprising:
    initiating a random access procedure on a special cell (SpCell), in case that there is no valid resource configured for the SR and the SR is triggered for the BFR of the SCell.

6. The method of claim 5, further comprising:
    stopping the random access procedure, in case that the MAC PDU including the BFR MAC CE is transmitted using an uplink (UL) grant other than a UL grant provided by a random access response.

7. The method of claim 1, wherein the BFR MAC CE is one of a regular BFR MAC CE or a truncated BFR MAC CE.

8. The method of claim 1, wherein the beam failure recovery information for the SCell includes candidate beam availability information for the SCell.

9. The method of claim 2, further comprising:
    cancelling the SR, in case that the SR is triggered for the BSR and an uplink (UL) grant accommodates all pending data available for transmission.

10. The method of claim 3, further comprising:
    receiving a MAC CE for deactivating the SCell; and
    deactivating the SCell based on the received MAC CE deactivating the SCell.

11. A terminal in a wireless communication system, the terminal comprising:
    a transceiver; and
    at least one processor operatively coupled with the transceiver and configured to:
        trigger a scheduling request (SR),
        identify whether the SR is triggered for a buffer status report (BSR),
        in case that the SR is not triggered for the BSR, identify whether the SR is triggered for a beam failure recovery (BFR) of a secondary cell (SCell), and cancel the SR, in case that the SR is triggered for the BFR of the SCell and a medium access control (MAC) protocol data unit (PDU) including a BFR MAC control element (CE) is transmitted, the BFR MAC CE containing beam failure recovery information for the SCell.

12. The terminal of claim 11, wherein the at least one processor is further configured to:
cancel the SR, in case that the SR is triggered for the BSR prior to a MAC PDU assembly and a MAC PDU including a BSR MAC CE is transmitted, the BSR MAC CE containing buffer status up to a last event that triggered the BSR prior to the MAC PDU assembly.

13. The terminal of claim 11, wherein the at least one processor is further configured to:
cancel the SR, in case that the SR is triggered for the BFR of the SCell and the SCell is deactivated.

14. The terminal of claim 11, wherein the at least one processor is further configured to:
stop an SR prohibit timer corresponding to the cancelled SR.

15. The terminal of claim 11, wherein the at least one processor is further configured to:
initiate a random access procedure on a special cell (SpCell), in case that there is no valid resource configured for the SR and the SR is triggered for the BFR of the SCell.

16. The terminal of claim 15, wherein the at least one processor is further configured to:
stop the random access procedure, in case that the MAC PDU including the BFR MAC CE is transmitted using an uplink (UL) grant other than a UL grant provided by a random access response.

17. The terminal of claim 11, wherein the BFR MAC CE is one of a regular BFR MAC CE or a truncated BFR MAC CE.

18. The terminal of claim 11, wherein the beam failure recovery information for the SCell includes candidate beam availability information for the SCell.

19. The terminal of claim 12, wherein the at least one processor is further configured to:
cancel the SR, in case that the SR is triggered for the BSR and an uplink (UL) grant accommodates all pending data available for transmission.

20. The terminal of claim 13, wherein the at least one processor is further configured to:
receive, via the transceiver, a MAC CE for deactivating the SCell, and
deactivate the SCell based on the received MAC CE deactivating the SCell.

* * * * *